US007787371B2

(12) United States Patent
Davolos et al.

(10) Patent No.: US 7,787,371 B2
(45) Date of Patent: Aug. 31, 2010

(54) METHOD AND APPARATUS FOR PROVIDING DISTINCTIVE LEVELS OF ACCESS TO RESOURCES ON A HIGH-SPEED WIRELESS PACKET DATA NETWORK

(75) Inventors: Christopher John Davolos, Warrenville, IL (US); Subhasis Laha, Aurora, IL (US); Patrick Jay Walsh, Bloomingdale, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2162 days.

(21) Appl. No.: 10/447,991

(22) Filed: May 29, 2003

(65) Prior Publication Data
US 2004/0240383 A1 Dec. 2, 2004

(51) Int. Cl.
*H04L 12/26* (2006.01)
(52) U.S. Cl. .................. 370/230; 370/253; 370/349; 370/389; 709/224; 709/227
(58) Field of Classification Search ............ 455/445, 455/442, 13; 370/230, 342, 235, 445
See application file for complete search history.

(56) References Cited

U.S. PATENT DOCUMENTS

| | | | | |
|---|---|---|---|---|
| 5,708,656 | A * | 1/1998 | Noneman et al. | 370/335 |
| 6,389,279 | B1 * | 5/2002 | Calabrese et al. | 455/417 |
| 7,043,249 | B2 * | 5/2006 | Sayeedi | 455/445 |
| 7,558,196 | B2 * | 7/2009 | Bi et al. | 370/230 |
| 2002/0045458 | A1 | 4/2002 | Parantainen | |
| 2002/0183081 | A1 * | 12/2002 | Elizondo Alvarez | 455/466 |
| 2003/0156537 | A1 * | 8/2003 | Soulhi et al. | 370/230 |
| 2005/0063304 | A1 * | 3/2005 | Sillasto et al. | 370/229 |

FOREIGN PATENT DOCUMENTS

| | | |
|---|---|---|
| WO | WO 99/05828 | 2/1999 |
| WO | WO 2004/002084 | 12/2003 |

OTHER PUBLICATIONS

Hiller et al CDMA2000 Wireless Data Requirements for AAA, RFC3141 Jun. 2001.*
TS-3GB-N.S0029-0v1.0 TIA/EIA-41-D Based Network Enhancements for CDMA Packet Data Service (C-PDS), Phasel, Revision:0 Aug. 27, 2002.*
TIA/EIA Engineering Standards, TIA/EIA Interim Standard, Medium Access Control (MAC) Standard for cdma2000 Spread Spectrum Systems, Aug. 1999, pp. 52-55, TIA, Virginia,USA.
3GPP2, Realm Configured Packet Data Session Dormancy Timer, Stage 1 Requirements, Dec. 6, 2001, 14 pages, 3GPP2, USA.

* cited by examiner

*Primary Examiner*—Seema S Rao
*Assistant Examiner*—Henry Baron
(74) *Attorney, Agent, or Firm*—Carmen Patti Law Group, LLC

(57) ABSTRACT

Methods and systems for managing system resources in a data transmission system are disclosed herein. An adaptive packet inactivity timer can be associated with the data transmission system, wherein the adaptive packet inactivity timer dynamically changes a behavior thereof based on one or more customer attributes, such as, for example, of quality of service (QoS) level. The customer attribute is linked to a plurality of timer parameters that define the behavior of the adaptive packet inactivity timer for management of the data transmission system. Additionally, the customer attributes can be assigned to a customer based on a contract level associated with the customer, or based on an application type intended for use with the customer contract.

17 Claims, 4 Drawing Sheets

METHOD AND APPARATUS FOR PROVIDING DISTINCTIVE LEVELS OF ACCESS TO RESOURCES ON A HIGH-SPEED WIRELESS PACKET DATA NETWORK

CROSS-REFERENCE TO RELATED APPLICATION

This application contains subject matter, which is related to the subject matter of the following application, which is assigned to the same assignee as this application. The below-listed application is hereby incorporated herein by reference in its entirety: "METHOD AND APPARATUS FOR SYSTEM RESOURCE MANAGEMENT IN A DATA TRANSMISSION SYSTEM," by Bi, et al., Ser. No. 10/117,102, filed Apr. 8, 2002.

TECHNICAL FIELD

The present invention relates to telecommunication systems, and more particularly, to resource management in telecommunication systems. The present invention also relates to timers utilized in managing telecommunication systems.

BACKGROUND OF THE INVENTION

Major cellular telecommunication system types include those operating according to the Global Services for Mobile (GSM) Standard, the TIA/EIA/IS-95 Mobile Station-Base Station Compatibility Standard for Dual Mode Wideband Spread Spectrum Cellular Systems (IS-95), the TIA/EIA/IS-136 Mobile Station-Base Station Compatibility Standard (IS-136), the TIA/EIA/IS-707 Spread Spectrum cdma2000 Standard (IS-2000), TIA/EIA 533 Analog Standard (AMPS/TACS), and UMTS. Other major cellular systems include, but are not limited to, those operating in the personal communications system (PCS) band according to the IS-95 based ANSI-J-STD-008 1.8-2.0 GHz standard, or those operating according to the GSM-based PCS 1900 (19000 MHz frequency range) standard.

Currently, most of the major cellular system standards are implementing data services into its digital cellular specification. For most of the standards, the data service specifications have been finalized, or are being finalized.

One data service specification includes a radio link protocol (RLP) that can be utilized to provide an octet stream service over forward and reverse traffic channels. The octet stream service carries variable length data packets of the point-to-point protocol layer. The RLP divides the point-to-point protocol packets into traffic channel frames for transmission. The traffic channel frames form the physical layer transmission frames. There is no direct relationship between the point-to-point protocol packets and the traffic channel frames.

A large packet may span several traffic channel frames, or a single traffic channel frame can include all or part of several point-to-point packets. The RLP does not take the higher level traffic channel framing into account, but operates on a featureless octet stream, delivering the octets to the system multiplex sublayer for transmission in the order the octets are received from the point-to-point layer. The data may be transmitted on the traffic channel as primary traffic or, for example, along with speech, as secondary traffic. The RLP generates and supplies one frame to the multiple sublayer every 20 milliseconds (ms). The size of the RLP frame depends on the type and size of the transmission frame available for transmitting the RLP frame.

The foregoing is but one example of the data transmission protocol layer in a major cellular system standard, for use in transmission of data and data packets. Other standards also possess similar data transmission protocols used for transmission of data packets.

The majority of the data transmission protocols include a finite timer for insuring data transmission sessions do not dominate system resources. Such data transmission protocols include 3G-1X fundamental channel (FCH) capabilities. For example, once a data transmission session is established, the timer can be activated to measure an amount of time elapsed between consecutively received/transmitted data packets. That is, after a first packet is received/transmitted, the finite timer is initiated. If a subsequent packet is not received/transmitted before the timer expires, the telecommunication system will de-activate (make dormant) the data session in favor of freeing up resources for use by other data or speech sessions.

Although the use of a timer in telecommunications systems insure system resources are not unnecessarily dominated by one or more data sessions, the use of a uniform timer does not take into consideration data sessions that may have packets that are generated in a substantially periodic nature. Such data sessions may include, but are not limited to heart beat retrieval systems that access weather, traffic, stock and other information. Typically, these types of data sessions require a very small amount of data to be transmitted very frequently, which can lead to a data session being maintained for a long period of time unite a finite value expires.

In general, a 3G-1X high-speed wireless packet data network is based on a circuit-based physical layer channel. Physical channels can be temporarily assigned to users while they are sending or receiving packet data traffic. The channel can be taken away when the mobile is idle (i.e., not sending or receiving data for some period of time). The period of time is commonly referred to as inactivity time. In current deployments, the inactivity timer is a static timer that is typically provisioned per subscriber or at the system level.

Thus, the current handling of how the 3G-1X fundamental channel (FCH) is removed from the users after a period of inactivity is based on system-level or subscriber-provisioned static timers. The present inventors have concluded that a need exists for an adaptive packet inactivity timer that can also be set at a system level. The present inventors believe that it is desirable to have an adaptive packet inactivity timer that changes behavior based on a user's QoS (Quality of Service) level or other user attribute.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved telecommunication system.

It is another aspect of the present invention to provide improved resource management methods and systems for use in telecommunication systems.

It is yet another aspect of the present invention to provide an adaptive packet inactivity timer for use in managing telecommunication systems.

The aforementioned aspects of the invention and other objectives and advantages can now be achieved as will now be summarized. Methods and systems for managing system resources in a data transmission system are disclosed herein. An adaptive packet inactivity timer can be associated with the data transmission system, wherein the adaptive packet inactivity timer dynamically changes a behavior thereof based on one or more customer attributes, such as, for example, of quality of service (QoS) level. The customer attribute can be linked to a plurality of timer parameters that define the behavior of the adaptive packet inactivity timer for management of the data transmission system.

Additionally, the customer attributes can be assigned to a customer based on a contract level associated with the customer, or based on an application type intended for use with the customer contract. The adaptive packet inactivity timer can be instantiated according to a plurality of varying parameters. Furthermore, the behavior of the adaptive packet inactivity timer can be altered, in response to instantiating the adaptive packet inactivity timer according to the plurality of varying parameters.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
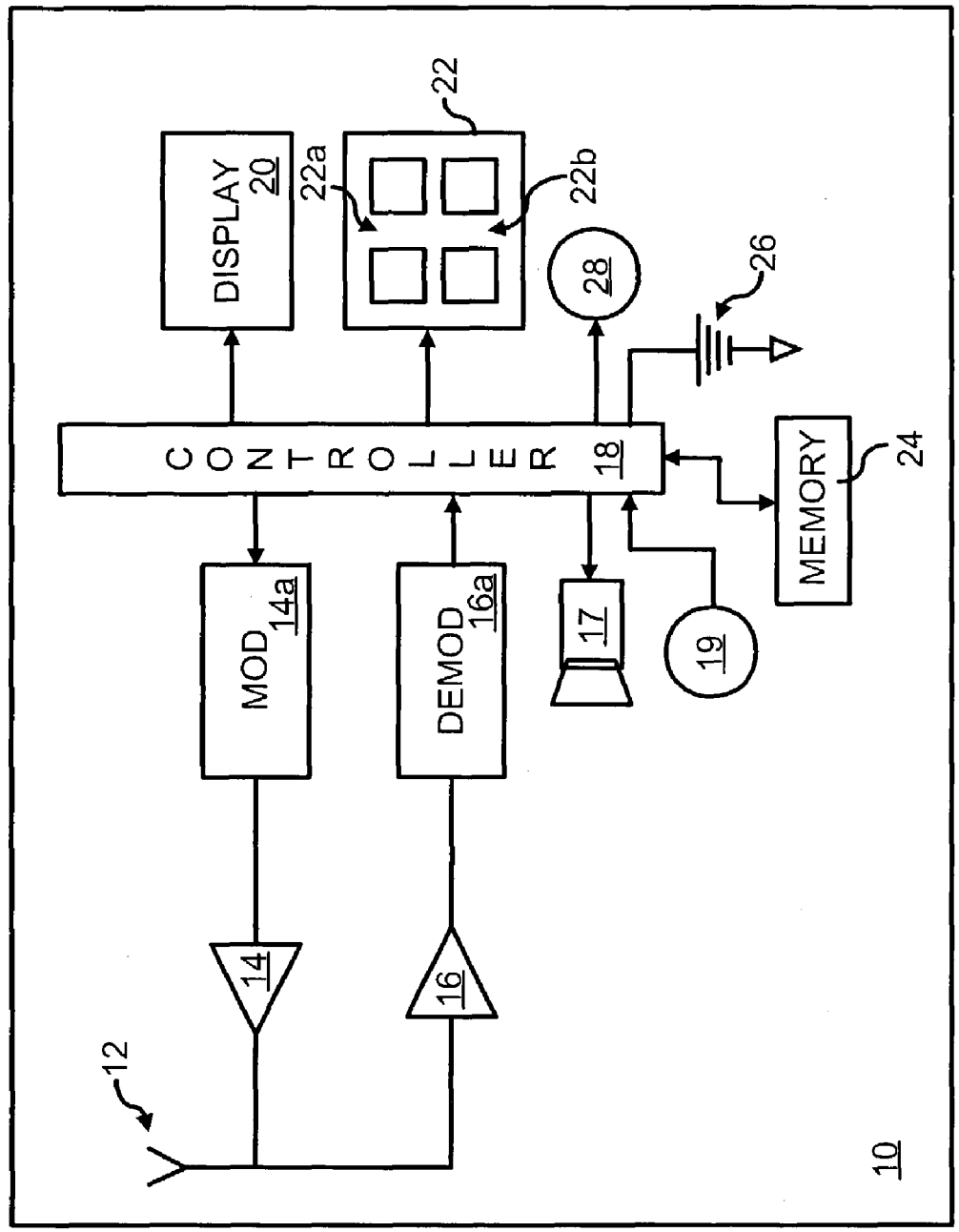
FIG. 1 illustrates a block diagram illustrating a cellular terminal that is suitable for practicing a preferred embodiment of the present invention.
Figure 2:
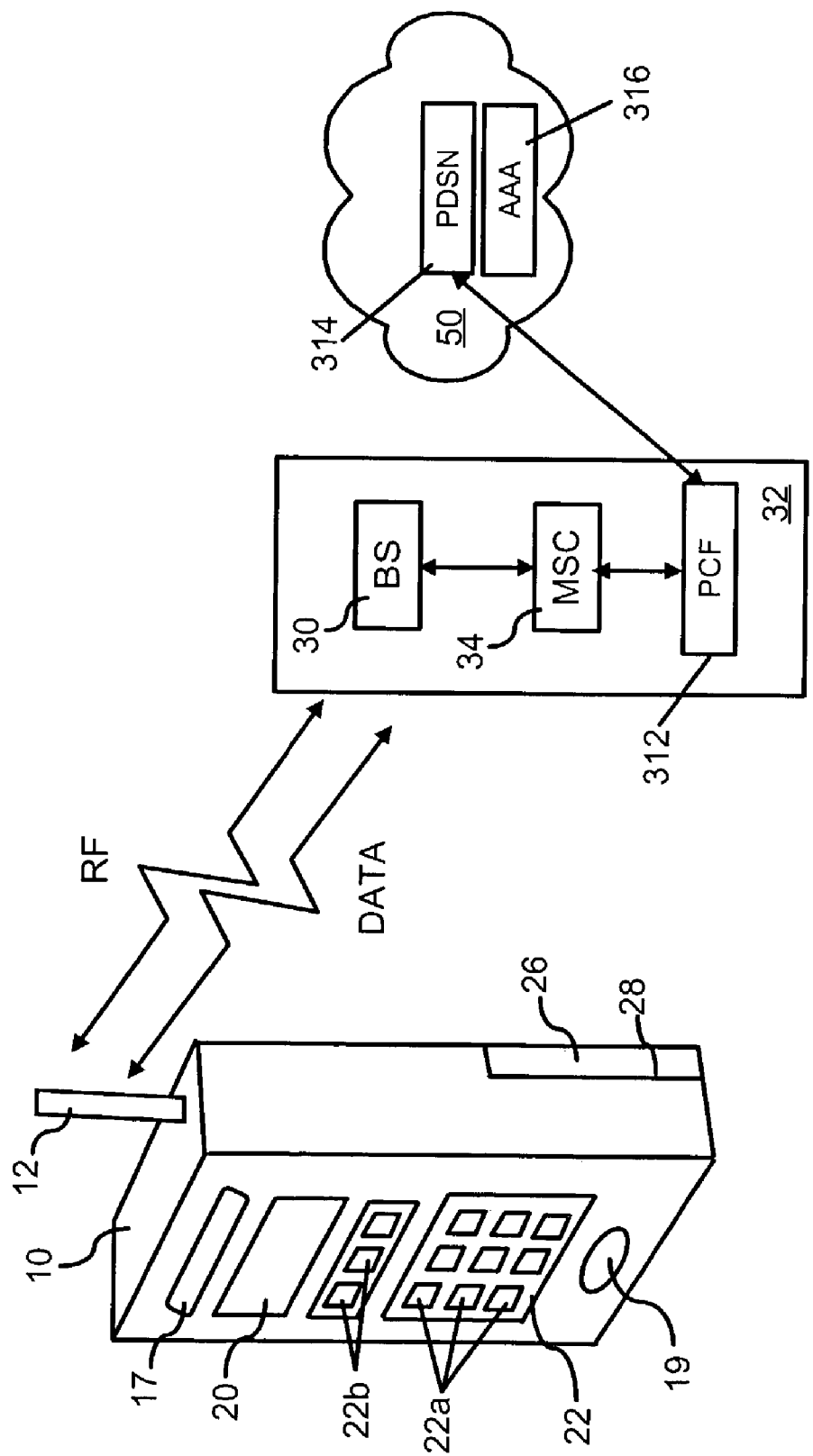
FIG. 2 illustrates the cellular terminal depicted in FIG. 1 in association with a wireless network, in which a preferred embodiment of the present invention can be implemented.

FIG. 1 illustrates a block diagram illustrating a cellular terminal that is suitable for practicing a preferred embodiment of the present invention. FIG. 2 illustrates the cellular terminal depicted in FIG. 1 in association with a wireless network, in which a preferred embodiment of the present invention can be implemented. Note that in FIGS. 1 and 2, identical or analogous parts are generally indicated by identical reference numerals. FIGS. 1 and 2 depict a wireless user terminal or mobile station (MS) 10 and a wireless network 32 that are suitable for practicing an embodiment of the present invention. The MS 10 includes an antenna 12 for transmitting signals to and receiving signals from a base site or a base station (BS) 30. The BS 30 is a part of the wireless network 32 that includes a mobile switching center (MSC) 34 and a packet control function (PCF) 312. The MSC 34 provides a connection to, for example, landline trunks when the MS 10 is involved in a communications session.

The MS 10 includes a modulator (MOD) 14a, a transmitter 14, a receiver 16, a demodulator (DEMOD) 16, and a controller 18 that provides signals to and receives signals from the modulator 14a and the demodulator 16a, respectively. These signals can include signaling information also speed, data, and/or packet data transmitted between the MS 10 and the BS 30 in accordance with the air interface standard of the applicable wireless system.

The controller 18 may include a digital signal processor device, a microprocessor device and various analog-to-digital converters, and other support circuitry. The control and signal processing functions of the MS 10 are allocated between these devices according to their respective capabilities. The MS 10 also includes a user interface having a conventional earphone or speaker 17, a conventional microphone 19, a display 20, a user input device, typically a keypad 22, all of which are coupled to the controller 18. The keypad includes conventional numeric (0-9) keys and related keys (#,*) 22a, and other keys 22b used for operating the MS 10. These other keys can include, for example, a send key, various menus scrolling soft keys, and a power key. The MS 10 can also include a battery 26 for powering the various circuits that are required to operate the MS 10.

The MS 10 also includes various memories shown collectively as memory 24. A memory 24 can store a plurality of constraints and variables that are utilized by the controller 18 during an operation of the MS 10. For example, memory 24 can store the values of various wireless system parameters. An operating program for controlling the operation of the controller 18 is also stored in memory 24. Additionally, memory 24 is capable of storing or buffering data prior to transmission or after reception.

The MS 10 can also function as a data terminal for transmitting or receiving packet data. As such, in this case, the MS 10 can be connected to a portable computer or a fax machine through suitable data port (DP) 28. Alternatively, the MS 10 can include relevant operating keys and/or software for access to a data network such as the Internet and/or an e-mail server.

The BS 30 also includes the necessary transmitters and receivers to allow signal exchange with the MS 10 of FIG. 1. Controllers, processors, and associated memories that may be located in the BS 30, the MSC 34 or the PCF 312 can provide for control of the BS 30, MSC 34, or the PCF 312, and can be utilized to implement the method and apparatus in accordance with the embodiments of the present invention. MSC 34 can further communicate with a packet data network 50, which can include a PDSN 314, and a module, which handles authentication, authorization and accounting (AAA), and is referred to as AAA 316.

It can be appreciated by those skilled in the art that elements such as PCF 312, PDSN 314, AAA 316, and so forth can be each implemented as a module or a group of modules. The term "module" as utilized herein generally refers to a software module, but may also refer to hardware equipment (i.e., physical modules), which may or may not operate independently of specific software. Thus, the terms "module" and "software module" can be utilized interchangeably to refer to the same general function. In the computer programming and telecommunications arts, a "module" can be implemented as a collection of routines and data structures that performs particular tasks or implements a particular abstract data type.

Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module can be based. Thus, when referring to a "module"

herein, the present inventors are generally referring to such software modules or implementations thereof, but may also be referring to hardware implementations alone or in combination with software implementations.

Figure 3:
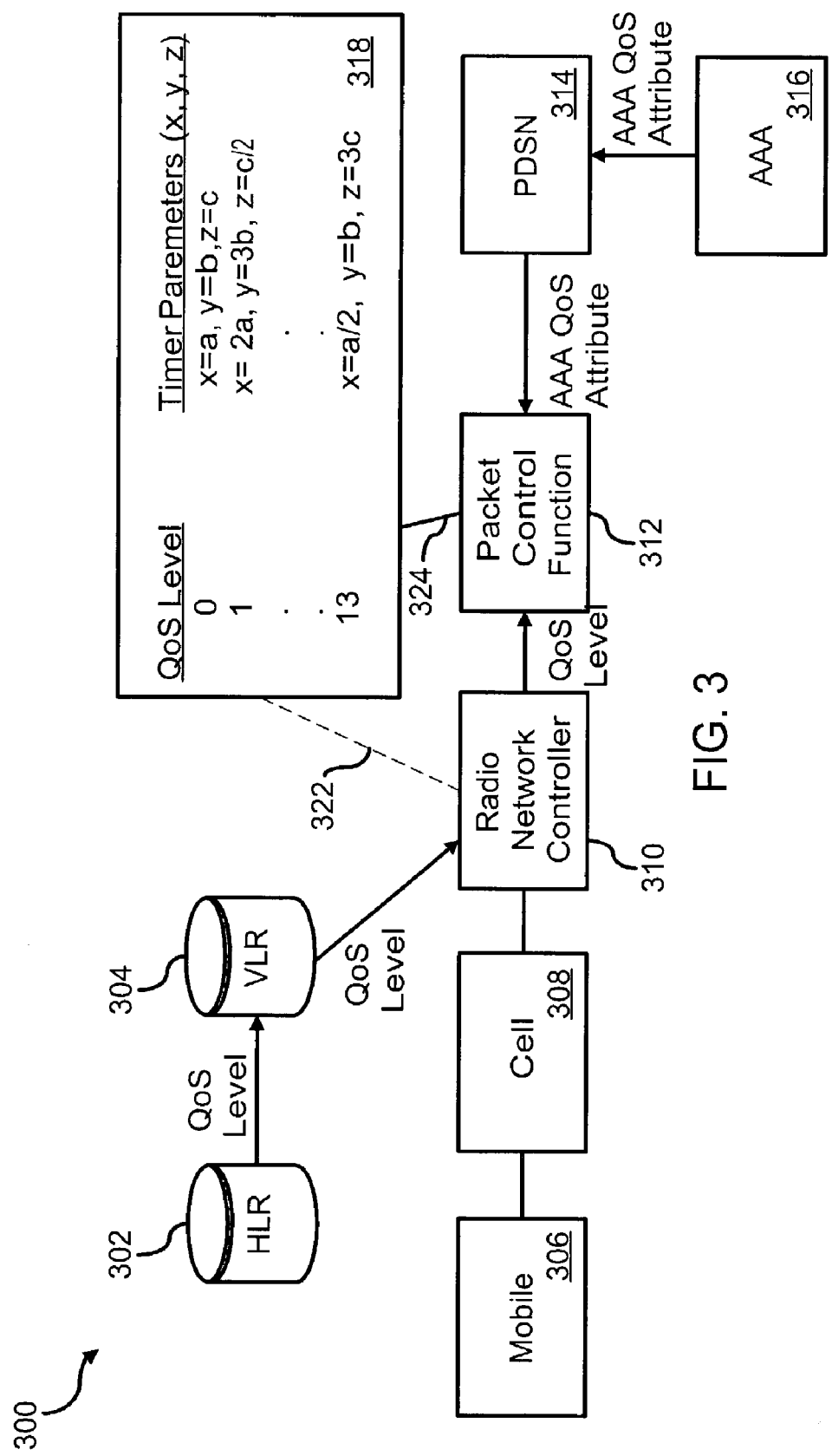
FIG. 3 illustrates a block diagram illustrating a system, which can be implemented in accordance with a preferred embodiment of the present invention.

FIG. 3 illustrates a block diagram illustrating a system 300, which can be implemented in accordance with a preferred embodiment of the present invention. Note that in FIGS. 2 and 3, like or identical parts or elements are indicated by identical reference numerals. System 300 generally comprises a data transmission system that can include an HLR 302, which can communicate data, such as a QoS level, to a VLR 304, which in turn can communicate with a radio network controller 310. A mobile 306 can communicate with a cell 308, which in turn can communicate radio network controller 310. Note that mobile 306 and cell 308 of FIG. 3 are generally analogous to mobile 10 and BS 30 of FIG. 2.

The QoS level can be transmitted from radio network controller 310 to a packet control function 312, which is mathematically indicated by block 318, which illustrates a plurality of timer parameters thereof associated with particular QoS levels (e.g., levels 1 to 13). The AAA 316 can transmit an AAA QoS attribute to PDSN 314, which in turn can transmit the AAA QoS attribute to packet control function 312. Note that the timer parameters can be stored with a database or other memory location associated with system 300. It can be appreciated by those skilled in the art the particular number of QoS levels illustrated in block 318 is shown for illustrative purposes only. For example, more than or less than 13 QoS levels can be implemented in accordance with an embodiment of the present invention, depending upon particular design goals. Block 318 is generally associated with packet control function 312, as indicated by arrow 324, but could in another embodiment, be associated with radio network controller 322, as optionally indicated by dashed line 322.

System 300 generally describes an adaptive packet inactivity timer that changes behavior based on a user's QoS level or other customer attribute. The timer is able to change behavior by instantiating itself with different parameters. The QoS level can be linked to a set of parameters that define the timer's behavior. This would allow some users to be given more liberal use of the 3G-1X resources while other users would be given more restrictive use. QoS levels can also be assigned based on the application types intended for use with a given contract. The timer can be instantiated in such a manner as to be optimized towards a particular set of applications as designated by a QoS level.

The QoS level utilized to indicate the desired behavior can be, for example, an existing ANSI-41 parameter that is sent to the packet control function 312 during call setup or another QoS attribute made available from the AAA 316. The adaptive packet inactivity timer generally runs on the packet control function 312. When it expires, the packet control function 312 notifies the radio network controller 310 to release the call, thereby releasing the traffic channel. The packet control function 312 can utilize the QoS level as an index into the parameter settings to instantiate itself.

Figure 4:
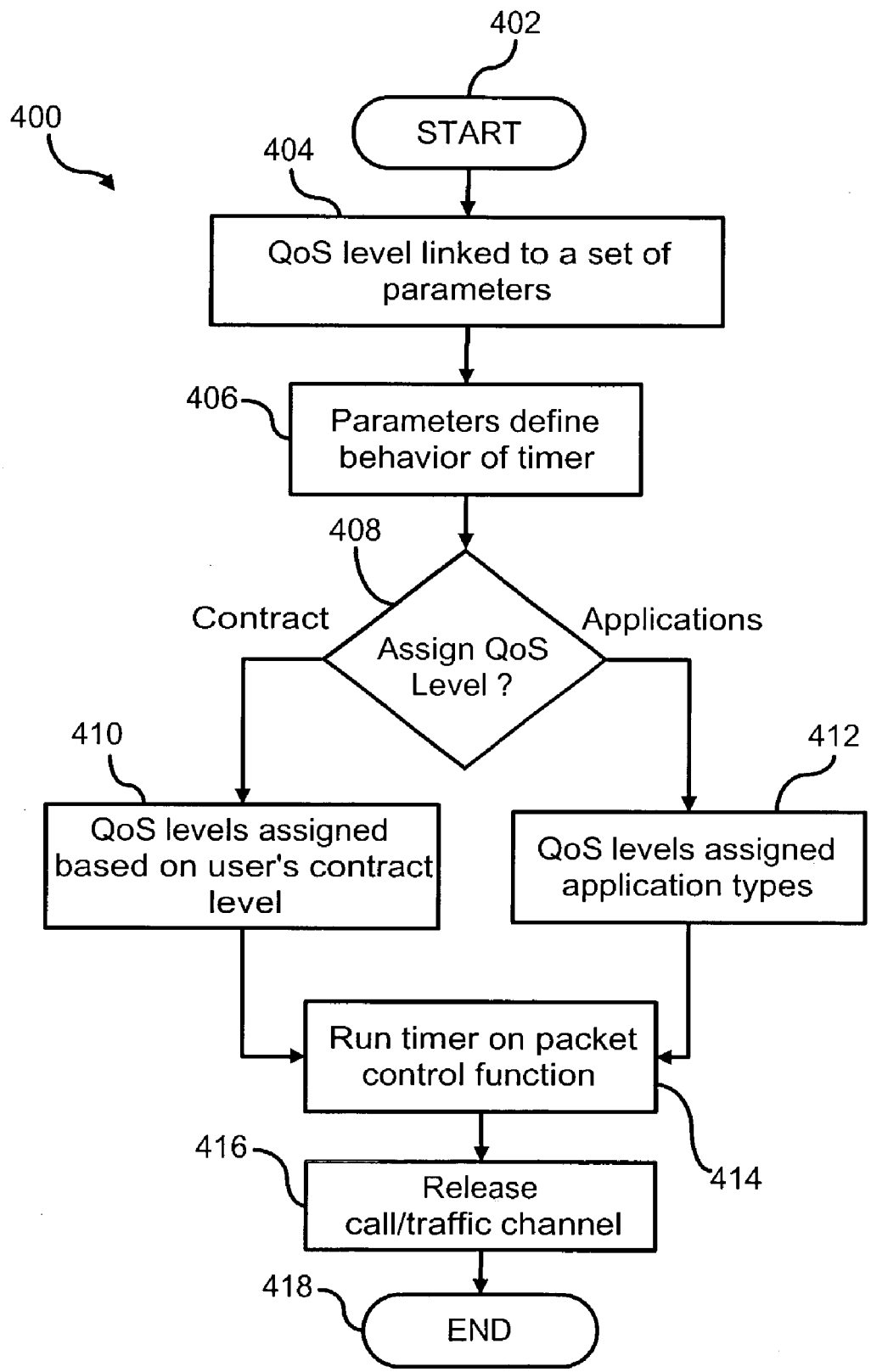
FIG. 4 illustrates a high-level flow chart of operations illustrating logical operational steps that may be followed in accordance with a preferred embodiment of the present invention.

FIG. 4 illustrates a high-level flow chart 400 of operations illustrating logical operational steps that may be followed in accordance with a preferred embodiment of the present invention. The process can be initiated, as indicated at block 402. Thereafter, as depicted at block 404, one or more QoS levels can be linked to a set of parameters that define the behavior of the adaptive packet inactivity timer. As indicated at block 406, the adaptive packet inactivity timer changes behavior based on the user's QoS level or other customer attribute. Thereafter, as depicted at decision block 408, a test is performed to determine the type of QoS assignment desired.

One or more QoS levels can be assigned based on the user's contract level, as indicated thereafter at block 410. Alternatively, one or more of the QoS levels can be assigned based on application types intended for use with a given contract, as indicated at block 412. Thereafter, as indicated at block 414, the adaptive packet inactivity timer can run on the packet control function 312. Next, the packet control function 312 can notify the radio network controller 310 to release the call/traffic channel, as indicated thereafter at block 416. The process can then terminate, as indicated at block 418.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. For example, it can be appreciated by those skilled in the art that system 300, which generally describes a configuration in which an adaptive packet inactivity timer can be associated with the data transmission system, can be modified such that said adaptive packet inactivity timer dynamically changes its behavior thereof based on one or more customer attributes, some of which can (although not necessarily) operate concurrently or simultaneously with one another.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

We claim:

1. A method for managing system resources in a data transmission system, said method comprising the steps of:
   associating an adaptive packet inactivity timer with said data transmission system, wherein said adaptive packet inactivity timer comprises a plurality of timer parameters that employ a plurality of varying values to dynamically change a behavior thereof when associated with one or more quality of service levels assigned based on at least one customer application type or contract level, and wherein at least one of said one or more quality of service levels comprises an ANSI-41 parameter sent during a call set-up; and
   linking said one or more quality of service levels to said plurality of timer parameters that define said behavior of said adaptive packet inactivity timer to manage use of said system resources in said data transmission system.

2. The method of claim 1 further comprising the step of:
   instantiating said adaptive packet inactivity timer according to said plurality of varying parameters;
   thereby changing said behavior of said adaptive packet inactivity timer.

3. The method of claim 1 further comprising the step of configuring said data transmission system to comprise an authentication, authorization and accounting (AAA) module for transmitting at least one customer attribute.

4. The method of claim 1 further comprising the step of configuring said data transmission system to comprise:
- at least one HLR operable to transmit said one or more quality of service levels to at least one VLR;
- a radio network controller operable to receive said one or more quality of service levels from said at least one VLR; and
- a packet control function operable to receive said one or more quality of service levels from said radio network controller, wherein said packet control function is operable to process said adaptive packet inactivity timer.

5. The method of claim 4 further comprising the steps of:
- automatically notifying said radio network controller when said adaptive packet inactivity timer expires at said packet control function; and
- thereafter releasing a traffic channel associated with a call thereof.

6. The method of claim 4 further comprising the step of:
- utilizing said one or more quality of service levels as an index of said plurality of timer parameters.

7. The method of claim 1 wherein the step of associating an adaptive packet inactivity timer with said data transmission system, and wherein said adaptive packet inactivity timer comprises said plurality of timer parameters that employ said plurality of varying values to dynamically change said behavior thereof when associated with one or more quality of service levels, further comprises the step of:
- associating said adaptive packet inactivity timer with said data transmission system, wherein said adaptive packet inactivity timer dynamically changes said behavior thereof based on a plurality of customer attributes operating simultaneously.

8. A method for managing system resources in a data transmission system, said method comprising the steps of:
- associating an adaptive packet inactivity timer with said data transmission system, wherein said adaptive packet inactivity timer comprises a plurality of timer parameters that employ a plurality of varying values to dynamically change a behavior thereof when associated with one or more quality of service levels assigned based on at least one customer application type or contract level, and wherein at least one of said one or more quality of service levels comprises an ANSI-41 parameter sent during a call set-up;
- linking said one or more quality of service levels to said plurality of timer parameters that define said behavior of said adaptive packet inactivity timer to manage use of said system resources in said data transmission system; and
- instantiating said adaptive packet inactivity timer according to said plurality of varying parameters;
- thereby changing said behavior of said adaptive packet inactivity timer.

9. An apparatus for managing system resources in a data transmission system, said apparatus comprising:
- an adaptive packet inactivity timer associated with said data transmission system, wherein said adaptive packet inactivity timer comprises a plurality of timer parameters that employ a plurality of varying values to dynamically change a behavior thereof when associated with one or more quality of service levels assigned based on at least one customer application type or contract level, and wherein at least one of said one or more quality of service levels comprises an ANSI-41 parameter sent during a call set-up; and
- a plurality of timer parameters stored within a database associated with said data transmission system, wherein said one or more quality of service levels are linked to said plurality of timer parameters, and wherein said plurality of timer parameters define said behavior of said adaptive packet inactivity timer to manage use of said system resources in said data transmission system.

10. The apparatus of claim 9 wherein:
- said adaptive packet inactivity timer is instantiated according to a plurality of varying parameters;
- to alter said behavior of said adaptive packet inactivity timer.

11. The apparatus of claim 9 wherein said data transmission system comprises an authentication, authorization and accounting (AAA) module for transmitting at least one customer attribute.

12. The apparatus of claim 9 wherein said data transmission system comprises:
- at least one HLR operable to transmit said one or more quality of service levels to at least one VLR;
- a radio network controller operable to receive said one or more quality of service levels from said at least one VLR; and
- a packet control function operable to receive said one or more quality of service levels from said radio network controller, wherein said packet control function is operable to process said adaptive packet inactivity timer.

13. The apparatus of claim 12 wherein said radio network controller is automatically notified when said adaptive packet inactivity timer expires at said packet control function, such that thereafter a traffic channel associated with a call thereof is released.

14. The apparatus of claim 9 wherein said adaptive packet inactivity tinier dynamically changes said behavior thereof based on a plurality of customer attributes operating simultaneously.

15. The method of claim 1 wherein said adaptive packet inactivity timer is optimized towards a particular set of applications designated by the at least one of said one or more quality of service levels.

16. The method of claim 8 wherein said adaptive packet inactivity timer is optimized towards a particular set of applications designated by the at least one of said one or more quality of service levels.

17. The apparatus of claim 9 wherein said adaptive packet inactivity timer is optimized towards a particular set of applications designated by the at least one of said one or more quality of service levels.

* * * * *